US012767447B2

(12) United States Patent
Knipper et al.

(10) Patent No.: US 12,767,447 B2
(45) Date of Patent: Oct. 20, 2026

(54) SORTING TERMINAL AND LOGISTICS SORTER

(71) Applicant: Deutsche Post AG, Bonn (DE)

(72) Inventors: Stefan Knipper, Gütersloh (DE); Hillar Loh, Niederkassel (DE); Jan Ahnert, Sankt Augustin (DE)

(73) Assignee: Deutsche Post AG, Bonn (DE)

( * ) Notice: Subject to any disclaimer, the term of this patent is extended or adjusted under 35 U.S.C. 154(b) by 126 days.

(21) Appl. No.: 18/617,576

(22) Filed: Mar. 26, 2024

(65) Prior Publication Data

US 2024/0327125 A1 Oct. 3, 2024

(30) Foreign Application Priority Data

Mar. 28, 2023 (DE) ..................... 10 2023 107 764.3

(51) Int. Cl.

*B65G 11/02* (2006.01)
*B07C 3/02* (2006.01)
*B65G 11/12* (2006.01)
*B65G 11/20* (2006.01)

(52) U.S. Cl.

CPC ................ *B65G 11/02* (2013.01); *B07C 3/02* (2013.01)

(58) Field of Classification Search

CPC .......... B65G 11/02; B65G 11/12; B65G 11/20
USPC .................................................... 193/2 R, 32
See application file for complete search history.

(56) References Cited

U.S. PATENT DOCUMENTS

| | | | | |
|---|---|---|---|---|
| 1,961,307 A | 6/1934 | Stauffer | | |
| 2,028,297 A | 1/1936 | Stockdale | | |
| 3,136,401 A | 6/1964 | Atanasoff et al. | | |
| 3,918,617 A * | 11/1975 | Gregg | B65D 90/582 | 222/536 |
| 4,401,242 A * | 8/1983 | Bonomo | B65D 90/54 | 193/17 |
| 4,478,327 A * | 10/1984 | Siniscal | B65H 31/00 | 414/795.8 |
| 4,660,469 A * | 4/1987 | Smith | B30B 9/326 | 100/95 |
| 5,220,986 A * | 6/1993 | Winkler, III | B65G 11/203 | 193/38 |
| 5,752,371 A | 5/1998 | Mosley | | |

(Continued)

FOREIGN PATENT DOCUMENTS

| | | |
|---|---|---|
| CN | 109499888 A | 3/2019 |
| CN | 208758081 U | 4/2019 |

(Continued)

*Primary Examiner* — Douglas A Hess
(74) *Attorney, Agent, or Firm* — The Webb Law Firm

(57) ABSTRACT

A sorting terminal for receiving goods to be sorted, in particular of a logistics sorter, including a chute with a first end for receiving goods to be sorted and a second end, a sliding surface extending from the first to the second end, a filler element connected to the second end of the chute, the filler element being pivotable from a first position to a second position, the filler element forming a sliding surface in the first position, so that goods to be sorted can slide from the chute in particular into a package receptacle via the filler element in particular into a packaging bag, the sliding surface of the filler element blocking the second end of the chute in the second position, so that no goods to be sorted can slide from the chute via the filler element.

13 Claims, 2 Drawing Sheets

(56) References Cited

U.S. PATENT DOCUMENTS

| | | | | |
|---|---|---|---|---|
| 5,927,461 | A * | 7/1999 | Jamieson | B28C 5/4262 193/6 |
| 6,814,210 | B1 * | 11/2004 | Hendzel | B65G 47/44 198/538 |
| 7,913,898 | B2 | 3/2011 | Frankenberg et al. | |
| 9,969,554 | B2 * | 5/2018 | Hartmann | B65G 11/203 |
| 11,027,923 | B1 * | 6/2021 | Mohammed | B65G 11/081 |
| 11,130,634 | B1 * | 9/2021 | Berg | B65G 11/203 |
| 2005/0061930 | A1 | 3/2005 | Hendzel | |
| 2022/0396439 | A1 | 12/2022 | Senninger et al. | |

FOREIGN PATENT DOCUMENTS

| | | | |
|---|---|---|---|
| CN | 110090804 | A | 8/2019 |
| CN | 110976303 | A | 4/2020 |
| CN | 111232541 | A | 6/2020 |
| CN | 210884128 | U | 6/2020 |
| CN | 210942368 | U | 7/2020 |
| CN | 212530155 | U | 2/2021 |
| DE | 102006039002 | A1 | 2/2008 |
| DE | 102008062353 | A1 | 7/2010 |
| EP | 3448789 | B1 | 3/2021 |
| GB | 191216118 | A | 1/1913 |
| GB | 645399 | | 11/1950 |
| GB | 813736 | | 5/1957 |
| GB | 2212129 | A | 7/1989 |

* cited by examiner

SORTING TERMINAL AND LOGISTICS SORTER

CROSS-REFERENCE TO RELATED APPLICATIONS

This application claims priority to German Patent Application No. 10 2023 107 764.3 filed Mar. 28, 2023, the disclosure of which is hereby incorporated by reference in its entirety.

BACKGROUND OF THE INVENTION

Field of the Invention

The present invention relates to a sorting terminal for receiving goods to be sorted, in particular of a logistics sorter. The present invention further relates to a logistics sorter with a plurality of such sorting terminals.

Description of Related Art

Present day logistics sorters for sorting goods to be sorted such as, for example, packages, parcels, letters, mail items or the like, typically comprise one or more active conveyor elements over which the goods to be sorted are transported. A plurality of sorting terminals branch from the active conveyor element, which are usually designed as chutes. The sorted goods slides over those chutes and falls into package receptacles of the sorting terminals, which are provided for the same and are mounted at the end of the respective chute. The package receptacles may be packaging bags, discharge tables or the like.

However, problems arise from the fact that the goods to be sorted can be very inhomogeneous in shape, and thus individual goods to be sorted may differ largely in weight. Moreover, the dimensions of the individual goods to be sorted can be very different. Thus, it is not ensured that each good to be sorted immediately gets into the packaging bag provided for the same. The goods to be sorted may slide beyond the packaging bag. This requires a manual and thus a possibly erroneous sorting by the personnel. In the case of heavy goods to be sorted, this may also result in a risk of injury to the personnel. Moreover, the goods to be sorted may become canted at the inlet opening of the packaging bag. Such a jam of sorted goods must then be cleared manually by the personnel. Again, there is a risk that individual goods to be sorted are not correctly sorted because they drop down.

Furthermore, the packaging bags have to be replaced at regular intervals, as soon as they have reached a certain fill. When changing the packaging bags, goods to be sorted can still be discharged by the logistics sorter into the respective sorting terminal. After a new packaging bag has been placed, these goods to be sorted have to be sorted again manually and be manually sorted into the correct packaging bag provided for the same.

SUMMARY OF THE INVENTION

It is an object of the present invention to provide a sorting terminal, as well as a logistics sorter for improving upon prior art.

The object is achieved with a sorting terminal as described herein, as well as a logistics sorter as described herein.

The sorting terminal of the present invention for receiving goods to be sorted, in particular of a logistics sorter, comprises a chute with a first end for receiving goods to be sorted in particular from an active conveyor element of the logistics sorter, and a second end, wherein a sliding surface extends from the first to the second end. Thus, the goods to be sorted can get from the first end to the second end via the sliding surface. In particular, the sliding surface is inclined, so that the goods to be sorted gets from the first end to the second end due to the weight force. As an alternative or in addition thereto, the chute may also comprise active conveyor elements to assist the movement of the goods to be sorted.

Furthermore, the sorting terminal comprises a filler element connected to the second end of the chute. The filler element can be pivoted from a first position to a second position. In the first position, the filler element forms a sliding surface, so that the goods to be sorted can slide from the chute over the sliding surface of the filler element and then reach a package receptacle. The sliding surface of the filler element can be formed flush with the sliding surface of the chute. As an alternative, the sliding surface of the filler element can be arranged below the sliding surface of the chute, so that the goods to be sorted fall from the chute onto the sliding surface of the filler element and, from there, reach the package receptacle.

The package receptacle may in particular be a packaging bag, into which the goods to be sorted are filled via the filler element. As an alternative, the package receptacle may be a box, a trolley, a container or the like. As an alternative, the goods to be sorted arrive on a discharge table via the filler element, wherein the goods to be sorted can slide onto the discharge table via the sliding surface of the filler element. As an alternative, the package receptacle is a further conveyor element, so that the goods to be sorted get into an inlet of the further conveyor element via the filler element and are then be conveyed onward by the same.

According to the invention, in the second position, the sliding surface of the filler element blocks the second end of the chute so that no goods to be sorted can slide from the chute via the filler element as long as the filler element is in the second position. Thus, in a first position of the filler element, the goods to be sorted can be filled into a packaging bag, for example. When the packaging bag is full and has to be replaced, the filler element is moved to the second position, so that the second end of the chute is blocked by the filler element. Thus, goods to be sorted sliding down thereafter are stopped on the chute by the filler element and cannot inadvertently fall from the sorting terminal. As soon as the packaging bag is replaced and a new packaging bag is clamped into the sorting terminal, the filler element can be moved to the first position again, so that the goods to be sorted can get into the packaging bag from the chute via the filler element. Thereby, a manual secondary sorting of goods to be sorted which fall out when the packaging bag is replaced is no longer required.

Preferably, the goods to be sorted are packages, parcels, letters, mail items and the like. However, the present invention is not particularly limited to the type of goods to be sorted. However, the goods to be sorted are preferably inhomogeneous, so that the goods to be sorted differ in weight and/or in dimension.

Preferably, the filler element can be pivoted about a pivot axis from a first position to a second position.

Preferably, the pivot axis of the filler element is arranged horizontally. Here, the first position of the filler element can correspond to a substantially horizontal orientation of the filler element, whereas, for moving it to the second position, the filler element can be tilted upward to a position angled with respect to the horizontal line and in particular to a vertical position.

Preferably, the pivot axis of the filler element is arranged vertically with respect to the sliding direction. In particular for the pivoting of the filler element against the second end of the chute to block the same, the pivot axis of the filler element is arranged perpendicular to the sliding direction, so that the filler element can be pivoted against the chute in the second position.

Preferably, the filler element in the second position forms a flush or form-fitting closure of the second end of the chute. Thus, with a filler element in the second position, no goods to be sorted can fall from the chute of the sorting terminal.

Preferably, in the second position, the sliding surface of the filler element is angled with respect to the sliding surface of the chute. In this manner, a common sliding surface of the chute and the filler element is interrupted. Due to the angled position of the sliding surface of the filler element, the second end of the chute is blocked so as to prevent goods to be sorted to slide down in the second position of the filler element. Specifically, the sliding surface of the filler element can be arranged vertically or substantially vertically with respect to the sliding surface of the chute.

The filler element preferably comprises a hopper with an opening. Due to the hopper, the sorting or filling of the goods to be sorted into a packaging bag, for example, can be improved. In particular, if the package receptacle is a packaging bag, a box, a trolley, a container or the like, a hopper can be provided, so that a safe filling of the goods to be sorted can be carried out. Thus, it is possible to prevent a canting of goods to be sorted, for example at the inlet opening of the packaging bag. The goods to be sorted can fall downward through the opening in particular into the packaging bag. For this purpose, the goods to be sorted are guided by the hopper.

Preferably, the hopper fully covers an inlet opening of the packaging bag. The hopper thus has a surface that is in particular larger than or of the same size as the inlet opening of the packaging bag. In particular, the opening of the hopper is smaller than or of the same size as the inlet opening of the packaging bag, so that the goods to be sorted reliably get into the packaging bag through the opening.

The filler element preferably has a baffle surface which, in the first position of the filler element, is arranged opposite the second end of the chute. The baffle surface protrudes in particular by a height of more than 100 mm and preferably more than 300 mm, especially with respect to a horizontal line defined by the second end of the chute. Goods to be sorted which slide beyond the opening of the packaging bag or the hopper, can be intercepted and stopped by the baffle plate, so that these goods to be sorted are guided into the packaging bag. It can thus be prevented that the goods to be sorted slide beyond the edge of the packaging bag and falls from the sorting terminal. Secondary sorting of these goods to be sorted is thus avoided, whereby errors in sorting can be reduced and the time required for secondary sorting can be saved.

The sorting terminal preferably comprises a bracket for fastening a packaging bag. Here, the position of the bracket is independent of the position of the filler element. In particular, the position of the bracket is fixed. Thus, for placing the packaging bag, the filler element can be moved to the second position from the first position. Thereby, the bracket is exposed at the same time. For this purpose, the bracket is arranged in particular below the filler element in the first position. The packaging bag can then be replaced and the filler element can subsequently be returned from the second position to the first position.

Preferably, the packaging bag is clampingly fixed at the bracket by the filler element. For this purpose, the lower side of the filler element engages the bracket, the opening of the packaging bag being fixed between the bracket and the filler element. In this manner, the packaging bag is prevented from unintentionally slipping out and in particular from coming off the bracket.

The sorting terminal preferably comprises one or a plurality of sensors for detecting one or more of a filling level, the position of the filler element and the presence of the packaging bag. Thus, for example, a sensor can be provided for detecting the filling level of the packaging bag, another sensor can be provided for detecting the position of the filler element, and another sensor can be provided for detecting the presence of the packaging bag. As an alternative, individual sensors can simultaneously detect several of these states, so that, for example, a common sensor can be provided for detecting the filling level of the packaging bag and the presence of the packaging bag.

Preferably, a sensor for detecting the filling level of the packaging bag and/or the presence of the packaging bag is arranged in or at the filler element. In particular, the sensor is arranged on the lower side and faces in the direction of the packaging bag. This enables the filling level and/or the presence of the packaging bag, for example, to be detected in a simple manner. In particular, the sensor is an infrared sensor, an ultrasound sensor and/or an optical sensor.

Preferably, a compensation element is provided, the compensation element applying a force on the filler element to move the filler element from the first position to the second position or vice versa. The compensation element can be, for example, a spring, a pneumatic cylinder, a rubber band, counter weights or the like. In particular, the compensation element substantially compensates the weight force of the filler element. In this context, substantially means that the filler element can easily be moved by one person. In particular with a horizontally arranged pivot axis of the filler element, it is thus not necessary for the person to muster the entire weight force in order to move the filler element from the first position to the second position. At the same time, the compensation element ensures that a dropping of the filler element from the second position to the first position is always damped to thereby prevent injuries or the like, for example. The movement from the second position to the first position can be sufficiently braked by the compensation element, so that there is time to react in an appropriate manner and to prevent injuries.

The filler element preferably has a latching in the first position and/or in the second position. Thereby, the filler element can be latched in the first position and/or the second position, so that an inadvertent pivoting of the filler element either from the first position to the second position or from the second position to the first position is prevented. If latched in the first position, it is prevented, for example, that the filler element is unintentionally lifted, while the goods to be sorted are sorted at the same time. It is thereby prevented that goods to be sorted do not get into the packaging bag, but fall from the sorting terminal, since it is always ensured that the goods to be sorted arrive in the packaging bag via the filler element. If latched in the second position, it is ensured that the filler element does not unintentionally fall down when the packaging bag is replaced, which would be a hazard to the personnel. In particular, the latching can be adapted to be unlocked manually, so that the latch can be unlocked manually by the personnel in the first position and/or the second position in order to move the filler element from the first position to the second position or vice versa. As an alternative, the latching can be unlocked automatically, for example when it is detected whether a packaging bag is presence or the filling level approaches a predetermined limit. If the change of the packaging bag is thus completed, this is detected, for example, by a sensor, whereby a latching of the filler element in the second position is released and the filler element can be moved from the second position back to the first position.

The filler element preferably comprises a plurality of intermediate latchings between the first position and the second position. The filler element can thereby be held in different positions. Specifically, in the event of an unintentional release of the latching in the second position, a dropping of the filler element is prevented, since the filler element can only be moved to the next intermediate latching.

The chute and the filler element in the first position preferably form a continuous sliding surface, so that goods to be sorted can be reliably forwarded and. in particular, get into the packaging bag.

Preferably, the filler element extends in part below the chute, particularly in the direction of the first end of the chute. Thereby, a common contact surface between the lower surface of the chute and the upper surface of the filler element is formed. Due to this contact surface, a transmission of force can occur, so that the filler element is retained in the first position. At the same time, the surface of the filler element can be enlarged, so that a reliable blocking of the second end of the chute is ensured, if the filler element is brought to the second position.

Preferably, a pivot axis of the filler element is arranged upstream of the second end of the chute, i.e. in front of the second end seen in the movement direction of the goods to be sorted or in the direction of the first end. As an alternative, the pivot axis is arranged immediately below the second end of the chute, so that the pivot axis and the second end lie on a common vertical axis. It is ensured thereby that the second end of the chute is securely blocked by the filler element and goods to be sorted are prevented from unintentionally sliding down, while the filler element is in the second position.

Moreover, the present invention relates to a logistics sorter for sorting goods to be sorted which comprises at least one active conveyor element and at least one and in particular a plurality of sorting terminals branching from the active conveyor element. The sorting terminals are embodied as described above. The active conveyor element can be a conveyor belt, for example. However, the present invention is not limited to the design of the active conveyor element, so that also roller conveyors or ball conveyors are included, for example. Specifically, the sorting terminals branch from the active conveyor element at an angle, the angle between the conveying direction of the active conveyor element and the sliding direction of the respective sorting terminal is 30 to 90°.

Preferably, sorting terminals branch from both sides of the active conveyor element.

Preferably, all sorting terminals are identical in design. As an alternative, at least two sorting terminals are designed differently.

BRIEF DESCRIPTION OF THE DRAWINGS

The terms Fig., Figs., Figure, and Figures are used interchangeably in the specification to refer to the corresponding figures in the drawings.

In the following, the invention is described in more detail by means of preferred embodiments with reference to the accompanying drawings.

In the Figures:

FIGS. 1A, 1B show an embodiment of the present invention in a first position; and FIGS. 2A, 2B show the embodiment of FIGS. 1A and 1B in a second position.

DESCRIPTION OF THE INVENTION

Figure 1B:
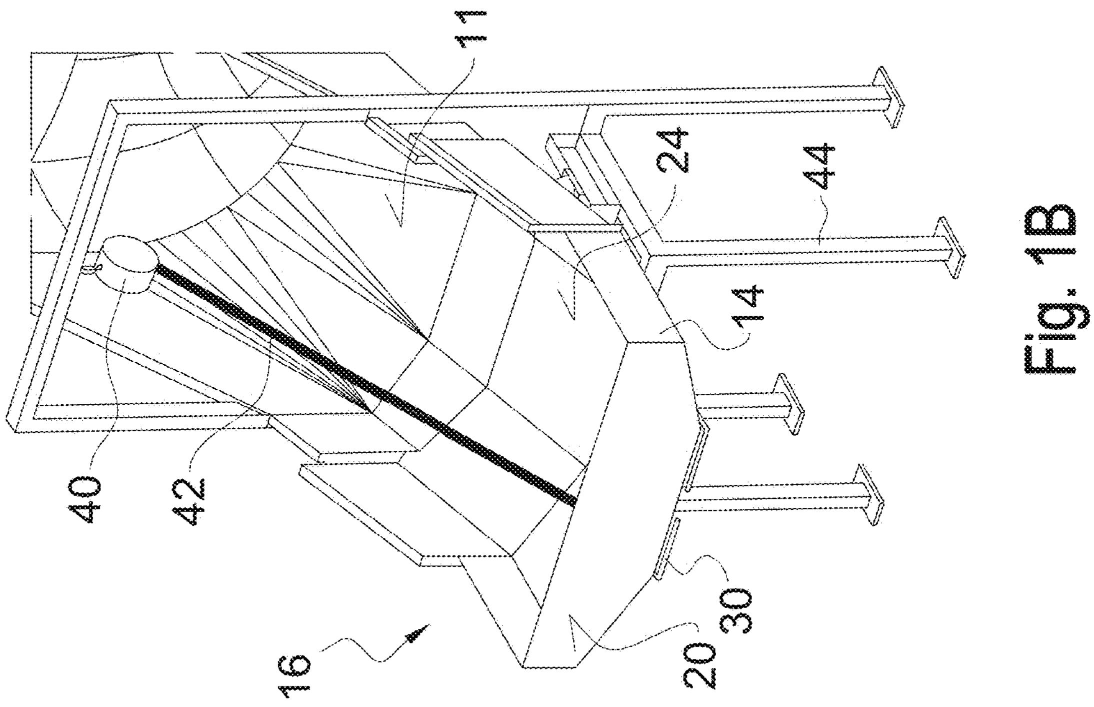
Figure 1A:
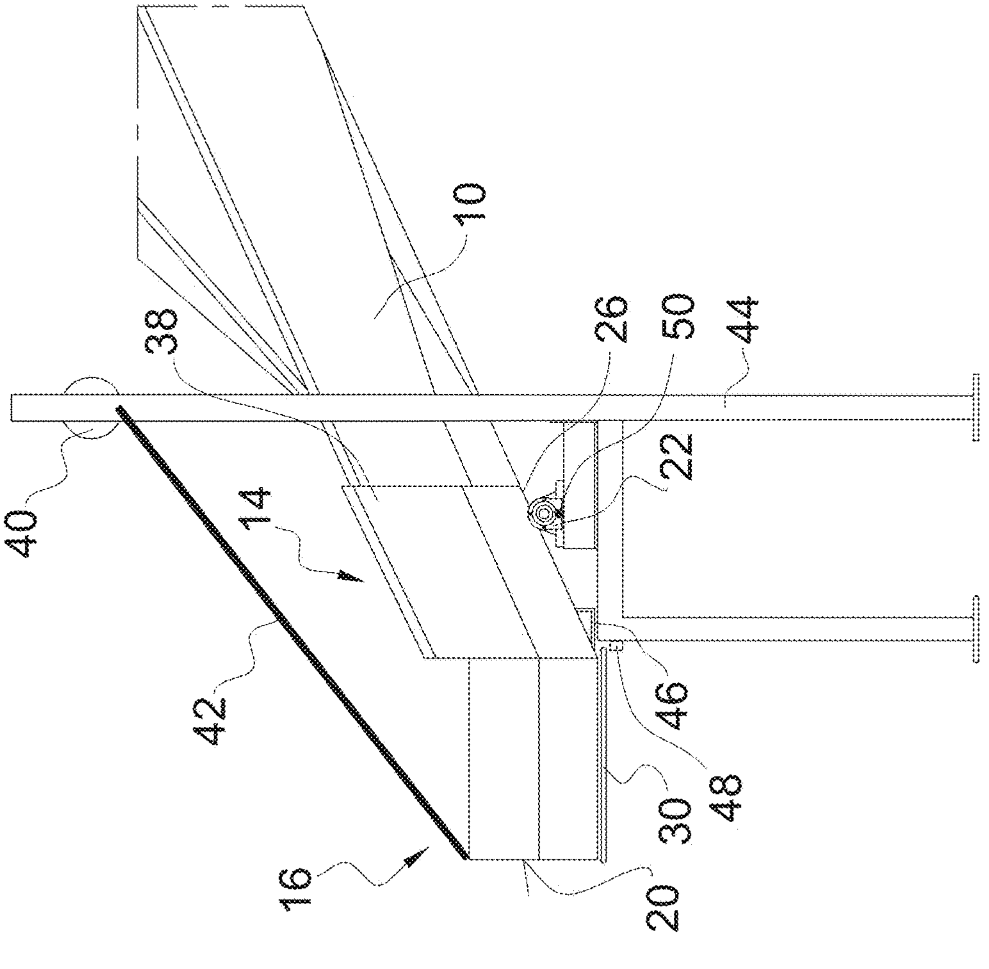

A sorting terminal for receiving goods to be sorted, in particular of a logistics sorter of the present invention, its shown in FIGS. 1A, 1B as well as 2A and 2B. The sorting terminal comprises a chute 10 which forms a sliding surface 11. The chute 10 has a first end (not illustrated) for receiving goods to be sorted. The chute 10 further has a second end which represents the lower end of the chute 10. The chute is inclined with respect to a horizontal line, so that the goods to be sorted are conveyed by weight force. Even if the chute 10 according to the Figures only has a sliding surface 11, roller conveyors, ball conveyors or other conveyor elements can also be provided which, for example, are designed as active or passive elements to assist the movement of the goods to be sorted along the chute 10.

Figure 2B:
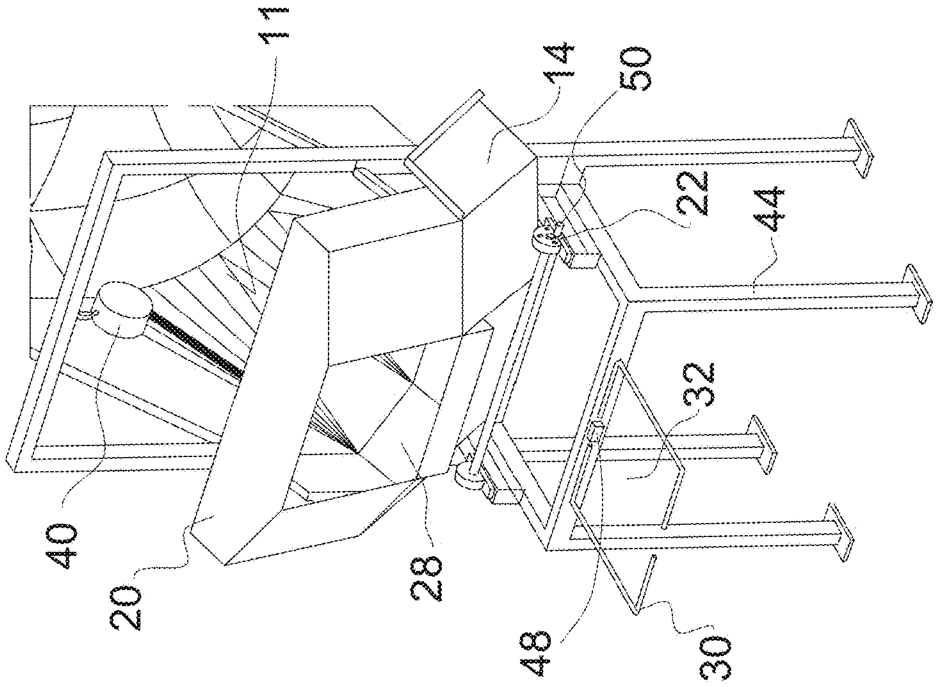
Figure 2A:
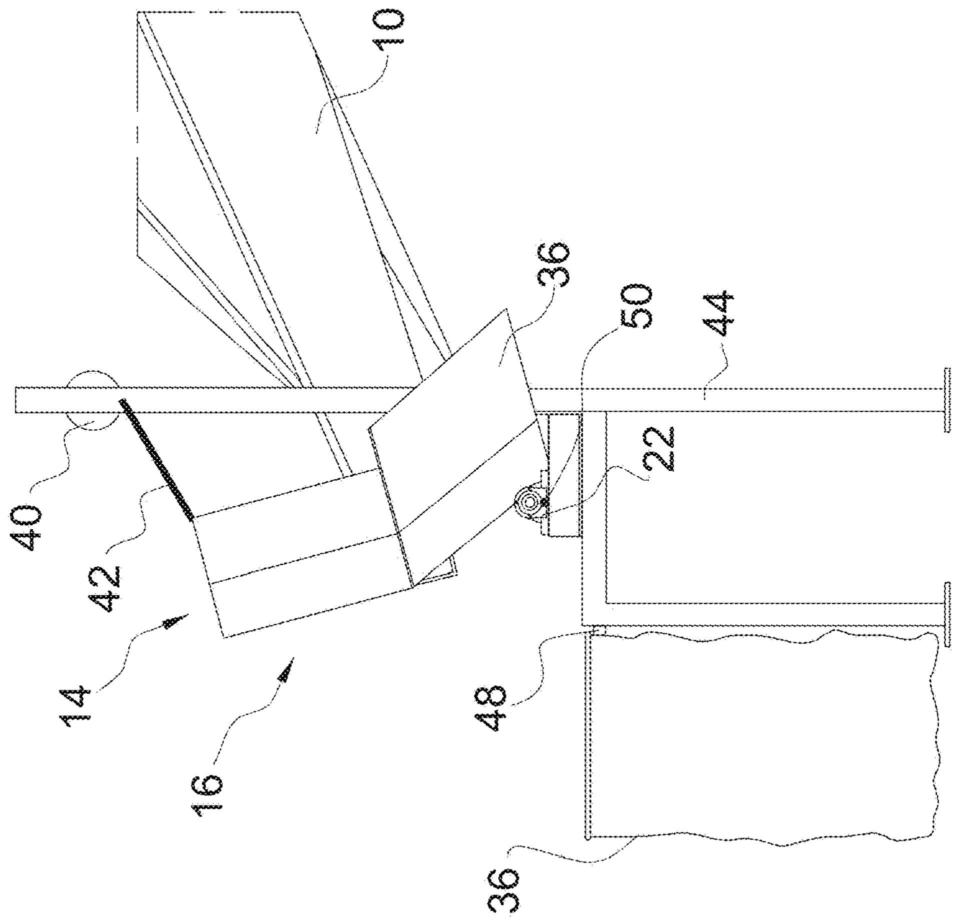

A filler element 14 is connected to the second end of the chute 10. The filler element 14 can be pivoted about a pivot axis 22 from a first position illustrated in FIGS. 1A, 1B to a second position illustrated in FIGS. 2A, 2B. The filler element 14 forms a sliding surface 24 which in the first position is flush with the sliding surface 11 of the chute 10. Goods to be sorted can thus reach the filler element 14 from the chute 10 without obstruction. The filler element 14 further comprises a hopper 16. The hopper 16 has an opening 28 (shown in FIG. 2B) through which goods to be sorted can fall down. The sorting terminal has a bracket 30 below the opening 28, with a packaging bag 36 possibly being connected to the bracket 30. The bracket 30 forms an opening 32 which corresponds to the filling opening or inlet opening of the packaging bag 36. The opening 28 of the hopper 16 lies immediately above the opening 32 of the bracket 30 when the filler element 14 is in the first position. Thus, goods to be sorted can get into the hopper 16 from the chute 10 via the sliding surface 24 of the filler element and then fall through the opening 28 into the packaging bag 36. Due to the hopper 16, canting of the goods to be sorted is reduced while they are filled into the packaging bag. Moreover, the filler element 14 comprises a baffle surface 20 arranged opposite the second end of the chute 10. Goods to be sorted, which slide beyond the opening 28 of the hopper 16, hit the baffle surface 20 and are stopped thereby. The baffle surface 20 prevents a falling out from the sorting terminal, so that secondary sorting of these goods to be sorted is obsolete.

The filler element 14 is fastened to a frame 44, in particular via the pivot axis 22. Moreover, the frame 44 and a contact surface 46 keep the filler element 14 in the first position. The filler element 14 can, of course, also be mounted in a different manner. The present invention is not limited to the design of the frame 44 illustrated in the Figures. Furthermore, a section 26 of the filler element 14 extends below the chute 10 and comes into contact with the lower side of the chute 10 so that a flush common sliding surface of the chute 10 and the filler element 14 is ensured. Moreover, a side wall 38 of the filler element 14 extends towards the first end and abuts on the outer side of the chute 10 when the filler element 14 is in the first position.

Specifically, the filler element 14 has an inlet connected to the second end, wherein a cross-section of the inlet of the filler element 14 substantially corresponds to a cross-section of the second end of the chute 10. In this context, substantially means that the dimensions differ only slightly, in particular to allow the inlet of the filler element 14 to abut on the outer side of the chute 10 in the area of the second end. Thereby, an almost transition-free connection of the filler element 14 to the chute 10 is possible.

Further, in the embodiment shown in the Figures, the pivot axis 22 is arranged immediately below the second end of the chute 10. The second end of the chute 10 and the pivot axis 22 thus lie on a common vertical axis. It is thus ensured that, when the filler element 14 is pivoted from the first position to the second position, the sliding surface 24 closes or blocks the second end of the chute 10 without a gap. When the filler element 14 is pivoted to the second position, illustrated in FIGS. 2A and 2B, the sliding surface 24 of the filler element 14 is arranged under an angle to the sliding surface 11 of the chute 10 so that goods to be sorted are stopped by the angled sliding surface 24 of the filler element. In this case, the goods to be sorted are prevented from falling out from the sorting terminal. For this purpose, the sliding surface 24 of the filler element 14 protrudes vertically beyond the sliding surface 11 of the chute 10 by more than 100 mm and in particular more than 200 mm. Thus, a secure blocking of the chute 10 can be ensured and the filler element 14 in the second position can prevent goods to be sorted from falling out unintentionally.

Preferably, a compensation element 40 is connected to the frame 44, which in the example of the embodiment shown in the Figures is connected to the filler element 14 via a connection element 42, such as a cable pull, for example. The compensation element 40 can be configured as a spring, a pneumatic damper, a counterweight or the like. The weight force of the filler element 14 is substantially compensated for by the compensation element 40 via the connection element 42, so that an inadvertent falling of the filler element 14 from the second position to the first position is prevented or at least braked. At the same time, personnel can be assisted by the compensation element 40 in pivoting the filler element 14 from the first position to the second position, so that it is not necessary to muster the entire weight force of the filler element 14.

A possible method for replacing a packaging bag thus comprises the following steps:

a) pivoting the filler element 14 from a first position to a second position and thereby simultaneously blocking the second end of the chute 10.

b) replacing a package receptacle, e.g. a packaging bag, in particular by detaching the packaging bag from a bracket 30 and clamping a new packaging bag into the bracket 30.

c) pivoting the filler element 14 from the second position to the first position, whereby the second end of the chute 10 is released and goods to be sorted can get into the packaging bag 36 via the sliding face 11 of the chute 10 and the sliding surface 24 of the filler element 14.

Thus, the present invention provides a sorting terminal which allows goods to be sorted to be securely filled into a packaging bag in a simple manner. This is ensured in particular also during the time the packaging bag is replaced, whereby manual secondary sorting of fallen goods to be sorted or a hazard to the personnel is excluded.

LIST OF REFERENCE NUMERALS

10 chute
11 sliding surface
14 filler element
16 hopper
20 baffle surface
22 pivot axis
24 sliding surface
26 section
28 opening
30 bracket
32 opening
36 packaging bag
38 side wall
40 compensation element
42 connection element
44 frame
46 contact surface
48 sensor
50 latching

The invention claimed is:

1. A sorting terminal of a logistics sorter for receiving goods to be sorted comprising:

a chute with a first end for receiving goods to be sorted and a second end, a sliding surface extending from the first to the second end; and a filler element connected to the second end of the chute, the filler element being pivotable from a first position to a second position, wherein the filler element forms a sliding surface in the first position, so that goods to be sorted can slide via the filler element from the chute into a package receptacle, wherein the sliding surface of the filler element blocks the second end of the chute in the second position, so that no goods to be sorted can slide from the chute via the filler element, wherein the filler element has a hopper with an opening into the package receptable, and wherein the filler element has a baffle surface opposite the second end of the chute and the baffle surface has a height of more than 100 mm.

2. The sorting terminal according to claim 1, wherein a pivot axis of the filler element is arranged horizontally.

3. The sorting terminal according to claim 1, wherein a pivot axis of the filler element is arranged perpendicular to the direction of sliding.

4. The sorting terminal according to claim 1, wherein in the second position, the sliding surface of the filler element is angled with respect to the sliding surface of the chute.

5. The sorting terminal according to claim 1, wherein the baffle surface has a height of more than 300 mm.

6. The sorting terminal according to claim 1, wherein a bracket for fastening a packaging bag, a position of the bracket being independent of the position of the filler element.

7. The sorting terminal according to claim 1, wherein one or more sensors are provided for detecting one or more of a filling level, the position of the filler element, the presence of the packaging bag.

8. The sorting terminal according to claim 1, wherein a compensation element is provided, the compensation element applying a force to move the filler element from the first position to the second position, or vice versa.

9. The sorting terminal according to claim 1, wherein the filler element has a latching in the first position and the second position.

10. The sorting terminal according to claim 1, wherein in the first position, the chute and the filler element form a continuous sliding surface.

11. The sorting terminal according to claim 1, wherein the filler element extends in part below the chute.

12. The sorting terminal according to claim 1, wherein a pivot axis of the filler element is arranged upstream of the second end or coincides with the second end.

13. A logistics sorter for sorting goods to be sorted, wherein the logistics sorter comprises at least one active conveyor element and at least one sorting terminal according to claim 1 branching from the at least one active conveyor element.

* * * * *